US 12,455,776 B1

(12) United States Patent
Zhou et al.

(10) Patent No.: US 12,455,776 B1
(45) Date of Patent: Oct. 28, 2025

(54) SYSTEM AND METHOD FOR OPERATION, MAINTENANCE, AND RESOURCE MANAGEMENT OF MEGA-CONSTELLATIONS BASED ON COMPUTING-NETWORK INTEGRATION

(71) Applicant: Xidian University, Xi'an (CN)

(72) Inventors: Di Zhou, Xi'an (CN); Min Sheng, Xi'an (CN); Hongmei He, Xi'an (CN); Sijing Ji, Xi'an (CN); Jiandong Li, Xi'an (CN); Yan Shi, Xi'an (CN); Weigang Bai, Xi'an (CN); Yan Zhu, Xi'an (CN)

(73) Assignee: Xidian University, Xi'an (CN)

( * ) Notice: Subject to any disclaimer, the term of this patent is extended or adjusted under 35 U.S.C. 154(b) by 0 days.

(21) Appl. No.: 19/260,306

(22) Filed: Jul. 4, 2025

(30) Foreign Application Priority Data

Feb. 21, 2025 (CN) .......................... 202510192427.4

(51) Int. Cl.
*G06F 9/50* (2006.01)
*G06F 9/48* (2006.01)
*H04B 7/185* (2006.01)

(52) U.S. Cl.
CPC .......... *G06F 9/5072* (2013.01); *G06F 9/4881* (2013.01); *H04B 7/18519* (2013.01)

(58) Field of Classification Search
CPC .. G06F 9/5072; G06F 9/4881; H04B 7/18519
See application file for complete search history.

(56) References Cited

U.S. PATENT DOCUMENTS 12,108,283 B2 * 10/2024 Sheng .................... H04B 7/088

OTHER PUBLICATIONS

CNIPA, Notification of First Office Action for CN202510192427.4, Apr. 11, 2025.
Xidian University (Applicant), Replacement claims (allowed) of CN202510192427.4, Apr. 18, 2025.
CNIPA, Notification to grant patent right for invention in CN202510192427.4, May 15, 2025.

* cited by examiner

*Primary Examiner* — Wissam Rashid
(74) *Attorney, Agent, or Firm* — Hemisphere Law, PLLC; Zhigang Ma

(57) ABSTRACT

A system and a method for operation, maintenance and resource management of mega-constellations based on computing-network integration are provided. The system includes: K MEO satellites and N LEO satellites, each MEO satellite manages multiple LEO satellites in each time slot of each scheduling cycle. Each LEO satellite is configured to acquire data of a computing task within a preset time period and perform data computation based on resource scheduling information for time slot t transmitted by an MEO satellite in each time slot t of each scheduling cycle within the preset time period. Each MEO satellite is configured to generate the resource scheduling information for time slot t based on its own resource task status in the time slot t, transmit the resource scheduling information for time slot t to each of the multiple LEO satellites under its management during the time slot t, and to perform coordinated data computation on computing tasks of the multiple LEO satellites it manages.

9 Claims, 4 Drawing Sheets

SYSTEM AND METHOD FOR OPERATION, MAINTENANCE, AND RESOURCE MANAGEMENT OF MEGA-CONSTELLATIONS BASED ON COMPUTING-NETWORK INTEGRATION

CROSS-REFERENCE TO RELATED APPLICATION

This application claims priority to Chinese Patent Application No. 202510192427.4, filed on Feb. 21, 2025, which is herein incorporated by reference in its entirety.

TECHNICAL FIELD

The disclosure relates to the technical field of satellite communication, and more particularly to a system and a method for operation, maintenance and resource management of mega-constellation based on computing-networking integration (CNI).

BACKGROUND

A mega-constellation is a satellite network system composed of hundreds to tens of thousands of satellites, which can provide full-time and continuous communication services. A hybrid multi-layer mega-constellation, including low earth orbit (LEO) satellites and middle earth orbit (MEO) satellites, has gradually become a first choice for meeting complex task requirements due to its advantages of wide coverage, rapid response speed, and low communication latency. With an explosive growth of task requirements, disadvantages of a mode that satellite transmits data back to a ground data center for processing are gradually prominent. On-orbit computing allows satellites to perform data processing directly on board and to process data from sensors or other devices without transmitting the data back to the ground data center, thereby reducing communication latency, improving response speed, and effectively conserving bandwidth and ground processing resources. Actively launching and deploying high-computing-capacity satellites to provide powerful data processing and real-time decision-making capabilities for multiple fields has become a trend in the related art.

Therefore, it is urgent to put forward a new architecture for satellite operation and maintenance management. By leveraging inter-satellite links to coordinate computational resources across multiple satellites, this architecture can form an intelligent operation, maintenance and management mechanism with deep integration of computing power and network capabilities. The intelligent operation, maintenance and management mechanism can fully leverage a synergistic effect of computing and communication resources of the mega-constellation, thereby realizing more flexible and efficient task scheduling and resource allocation, supporting more complex space applications, and promoting development of satellite networks towards greater autonomy and intelligence. However, this multi-layer mega-constellation structure also brings great challenges to operation, maintenance and resource management. Methods for the operation, maintenance, and resource management of satellite networks in related art primarily rely on independent satellite computation or scheduling that is limited to static time slots. In a mega-constellation network, however, efficient allocation and scheduling of computation, communication, and energy resources across different orbital layers pose substantial challenges. Firstly, how to cooperatively allocate computing and communication resources among satellites at different levels to improve task processing efficiency is an important issue for operation and maintenance and resource management. Secondly, tasks and resources in the satellite networks are highly dynamic and uncertain, as task load, resource availability and communication link state change over time, rendering static control strategy in related art cannot effectively cope with these changes. Therefore, how to introduce a concept of computing-network coordination into the mega-constellation network and redesign architecture and methods for operation, maintenance and network management has become an important development direction of the mega-constellations in the future.

Studies of architecture and methods for operation and maintenance and resource management of the mega-constellations have been proposed in related art. However, the studies have the following defects.

Architecture and scheduling methods in related art are often limited to handling fixed tasks or predictable tasks, and cannot cope with dynamic and complex task requirements. Methods in related art are limited to coordinative computing by transmitting a large amount of actual task data between satellites, which consumes a large amount of communication bandwidth and result in high latency and long task response times. Meanwhile, satellite communication-computing coordination methods in related art still rely on management and operation of ground control stations. Therefore, it is impossible to achieve higher real-time performance or better resource management and scheduling capabilities.

SUMMARY

To solve above defects in related art, the disclosure provides a system and a method for operation, maintenance and resource management of mega-constellation based on computing-networking integration.

Technical problems to be solved by the disclosure are realized by the following technical solutions.

The system for operation, maintenance and resource management of mega-constellation based on computing-networking integration provided by an embodiment of the disclosure includes an MEO satellite coordination-level management and control architecture with MEO satellites K in quantity (i.e., with K number of MEO satellites) and an LEO satellite edge-level management and control architecture with LEO satellites N in quantity (i.e., with N number of LEO satellites), in which the MEO satellites are connected to each other through communication links, the LEO satellites are connected to each other through the communication links, the MEO satellites are connected to the LEO satellites through the communication links, and each MEO satellite manages multiple LEO satellites in each time slot of each scheduling cycle;

each of the LEO satellites is configured to: acquire data of a computing task during a preset time period, and in each time slot t of each scheduling cycle within the preset time period, determine, based on resource scheduling information for the time slot t transmitted by the MEO satellite, whether to perform data computation on the computing task in the time slot t and a data volume that needs to be computed when performing the data computation, and perform computation on corresponding data volume of the computing task in the time slot t based on the data volume that needs to be computed; and each of the MEO satellites is configured to: obtain its own resource task status in the time slot t, generate the resource scheduling information for the time slot t based on its own resource task status in the time slot t by using a trained resource scheduling information generation network, transmit the resource scheduling information for the time slot t to each of the multiple LEO satellites managed by the MEO satellite in the time slot t, determine, based on the resource scheduling information for the time slot t, whether to perform data computation on the computing task of each of the multiple LEO satellites managed by the MEO satellite in the time slot t and a data volume that needs to be computed when performing the data computation, and perform computation on corresponding data volume of the computing task of each of the multiple LEO satellites managed by the MEO satellite in the time slot t based on the data volume that needs to be computed; in which the resource scheduling information for the time slot t represents: in the computing task of each of the multiple LEO satellites managed by the MEO satellite in the time slot t, a proportion of a data volume computed by the MEO satellite in the time slot t to a total data volume of the computing task of the LEO satellite, and values of the resource scheduling information range from 0 to 1.

A method for operation, maintenance and resource management of mega-constellation based on computing-networking integration, applied to each of the MEO satellites in aforementioned system for operation, maintenance and resource management of mega-constellation based on computing-networking integration, includes:

obtaining resource task status of the MEO satellite itself in current time slot of current scheduling cycle;

generating resource scheduling information for the current time slot based on the resource task status of the MEO satellite itself in the current time slot by using the trained resource scheduling information generation network; in which the trained resource scheduling information generation network is obtained by training through local reinforcement learning and federated learning methods, the resource scheduling information for the current time slot represents: in a computing task of each of the multiple LEO satellites managed by the MEO satellite in the current time slot, a proportion of a data volume computed by the MEO satellite to a total data volume of the computing task of the LEO satellite;

transmitting the resource scheduling information for the current time slot to each of the multiple LEO satellites managed by the MEO satellite in the current time slot;

determining, based on the resource scheduling information for the current time slot, whether to perform data computation on the computing task of each of the multiple LEO satellites managed by the MEO satellite in the current time slot and a data volume that needs to be computed when performing the data computation; and performing, when needing to perform data computation on the computing task of each of the multiple LEO satellites managed by the MEO satellite in the current time slot, computation on corresponding data volume of the computing task of each of the multiple LEO satellites managed by the MEO satellite in the current time slot based on the data volume that needs to be computed.

Compared with related art, the disclosure has the following beneficial effects.

The system for operation, maintenance and resource management of mega-constellation provided by the disclosure includes a two-level architecture, namely the MEO satellite coordination-level management and control architecture and the LEO satellite edge-level management and control architecture. Each of the MEO satellites in the MEO satellite coordination-level management and control architecture can obtain its own real-time resource task status, generate real-time resource scheduling information based on its own real-time resource task status, perform coordinated data computation of the computing task of each of the multiple LEO satellites managed by the MEO satellite based on the real-time resource scheduling information, and drive each of the multiple LEO satellites managed by the MEO satellite to perform data computation on the computing task based on the real-time resource scheduling information. Therefore, real-time allocation of computing tasks in a whole satellite network and comprehensive utilization of inter-layer resources can be carried out through the MEO satellite coordination-level management and control architecture, and real-time computing of edge nodes and real-time coordinative execution of communication tasks can be carried out through the LEO satellite edge-level management and control architecture. In this way, dynamic scheduling and efficient utilization of resources can be carried out according to real-time task requirements without relying on management and control of ground controllers, and is not limited to fixed tasks or predictable tasks. Problems of high delay and long task response time caused by transmitting a large amount of task data between different MEO satellites for coordinative computing are addressed. The two-level architecture can achieve efficient computing scheduling for dynamic and complex task requirements, and increase a completed task data volume of the whole satellite network. The two-level architecture not only has higher real-time performance and better resource management and scheduling capabilities but also has a higher completed task data rate.

The disclosure will be further described in detail with reference to attached drawings and embodiments.

DETAILED DESCRIPTION OF EMBODIMENTS

The disclosure will be further described in detail with reference to embodiments, but embodiments of the disclosure are not limited thereto.

A system for operation, maintenance and resource management of mega-constellation based on computing-networking integration provided by the disclosure includes an MEO satellite coordination-level management and control architecture with MEO satellites K in quantity (i.e., with K number of MEO satellites) and an LEO satellite edge-level management and control architecture with LEO satellites N in quantity (i.e., with N number of LEO satellites). K and N are positive integers greater than 1. The MEO satellites are connected to each other through communication links, the LEO satellites are connected to each other through the communication links, and the MEO satellites are connected to the LEO satellites through the communication links. Each of the MEO satellites manages multiple LEO satellites in each time slot of each scheduling cycle. Each of the MEO satellites manages different or the same LEO satellites in different time slots. Different MEO satellites may manage the same or different numbers of LEO satellites in different time slots.

Figure 1:
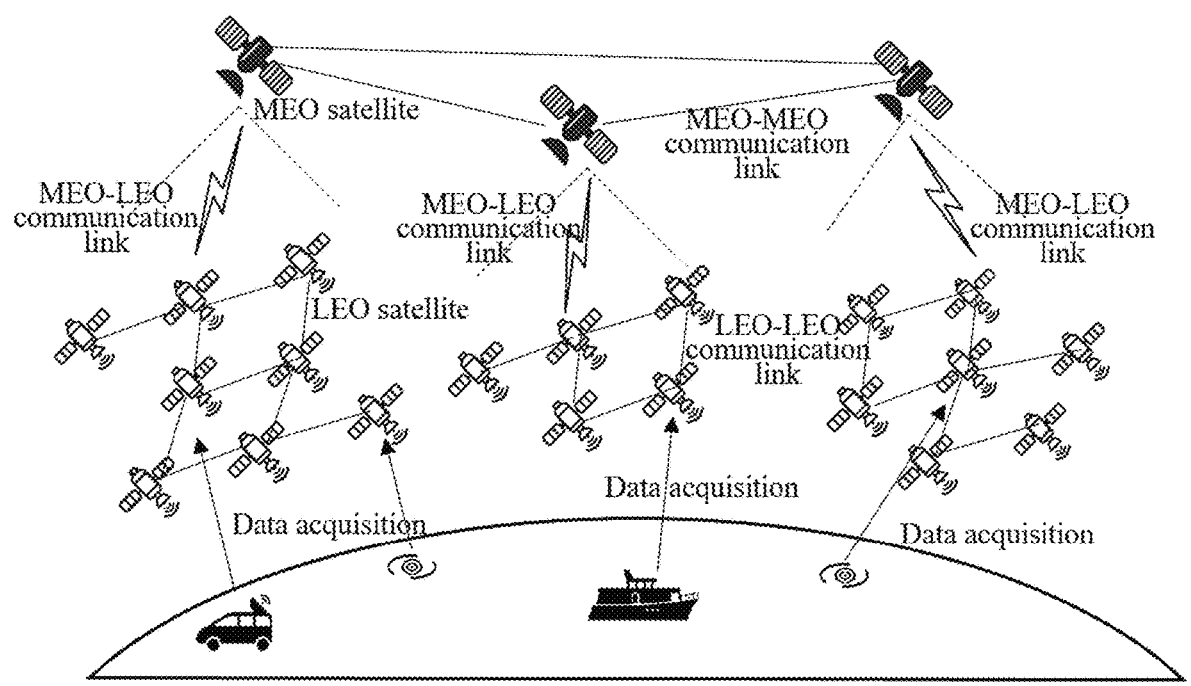
FIG. 1 illustrates a schematic architectural diagram of a system for operation, maintenance and resource management of mega-constellation based on computing-networking integration according to an embodiment of the disclosure.

Each of the LEO satellites is configured to: acquire data of a computing task during a preset time period, and in each time slot t of each scheduling cycle within the preset time period, perform data computation on the computing task based on resource scheduling information for the time slot t transmitted by the MEO satellite. Each of the MEO satellites is configured to obtain its own resource task status in the time slot t, generate the resource scheduling information for the time slot t based on its own resource task status in the time slot t by using a trained resource scheduling information generation network, transmit the resource scheduling information for the time slot t to each of the multiple LEO satellites managed by the MEO satellite in the time slot t, and perform coordinated data computation on the computing task of each of the multiple LEO satellites managed by the MEO satellite based on the resource scheduling information for the time slot t. The resource scheduling information for the time slot t represents: in the computing task of each of the multiple LEO satellites managed by the MEO satellite in the time slot t, a proportion of a data volume computed by the MEO satellite to a total data volume of the computing task of the LEO satellite. In an embodiment, each of the LEO satellites collects data from outside world according to the computing task to obtain data of corresponding computing task, for example, acquiring data of ecological monitoring task by conducting ecological monitoring of surrounding environment, acquiring data of meteorological monitoring task by meteorological observations of the surrounding environment, acquiring data of computing task related to remote-sensing images by obtaining remote-sensing images of the surrounding environment, and so on. Each computing task corresponds to a preset time period to indicate that computation of the computing task needs to be carried out and completed within the preset time period. In an embodiment, FIG. 1 illustrates a schematic architectural diagram of the system for operation, maintenance and resource management of mega-constellation based on computing-networking integration according to an embodiment of the disclosure. As illustrated in FIG. 1, the system for operation, maintenance and resource management of mega-constellation includes three MEO satellites; the three MEO satellites are connected with each other through communication links, and the three MEO satellites are connected with LEO satellites through communication links; an area formed by dotted lines below each of the three MEO satellites represents a signal radiation range of the MEO satellite; a semicircle in FIG. 1 represents the Earth, and arrows pointing to the LEO satellites from the Earth represents acquisition of ground data from LEO. Each of the three MEO satellites manages multiple LEO satellites in each time slot, and each of the LEO satellites can acquire the data of the computing task from the outside world, for example, acquiring the data of the computing task by receiving data transmitted from ships, cars and other equipment on the ground.

In an embodiment, values of the resource scheduling information range from 0 to 1. Base on resource scheduling information for each time slot, each of the MEO satellites can determine whether to perform data computation on the computing task in the time slot and a data volume that needs to be computed when performing the data computation, and each of the LEO satellites can determine whether to perform data computation on the computing task in the time slot and a data volume that needs to be computed when performing the data computation. When a value of the resource scheduling information for a first certain time slot is 0, it indicates that in the first certain time slot, the MEO satellite does not need to perform computation on the computing task needing to be computed of each of the multiple LEO satellites managed by the MEO satellite in the first certain time slot, and each of the multiple LEO satellites managed by the MEO satellite needs to perform computation on a total amount of the computing task needing to be computed of its own in the first certain time slot. When a value of the resource scheduling information for a second certain time slot is 1, it indicates that the MEO satellite needs to perform computation on the total amount of the computing task needing to be computed of each of the multiple LEO satellites managed by the MEO satellite in the second certain time slot, and each of the multiple LEO satellites managed by the MEO satellite does not need to perform computation on the computing task needing to be computed of its own in the second certain time slot. When a value of the resource scheduling information for a third certain time slot is 0.4, it indicates that in the third certain time slot, the MEO satellite needs to perform computation on 40% of the total amount of the computing task needing to be computed of each of the multiple LEO satellites managed by the MEO satellite in the third certain time slot, and each of the multiple LEO satellites managed by the MEO satellite needs to perform computation on 60% of the total amount of the computing task needing to be computed of its own in the third certain time slot. In an embodiment, the value of the resource scheduling information is one of $\{0, 0.2, 0.4, 0.6, 0.8, 1\}$. On this basis, each of the LEO satellites is specifically configured to determine whether to perform data computation on the computing task in the time slot t based on the resource scheduling information for the time slot t transmitted by the MEO satellite and a data volume that needs to be computed when performing the data computation, and perform the data computation on corresponding data volume of the computing task in the time slot t based on the data volume that needs to be computed. Each of the MEO satellites is specifically configured to determine whether to perform data computation on the computing task of each of the multiple LEO satellites managed by the MEO satellite in the time slot t based on the resource scheduling information for the time slot t and a data volume that needs to be computed when performing the data computation, and perform the data computation on corresponding data volume of the computing task of each of the multiple LEO satellites managed by the MEO satellite in the time slot t based on the data volume that needs to be computed.

Figure 2:
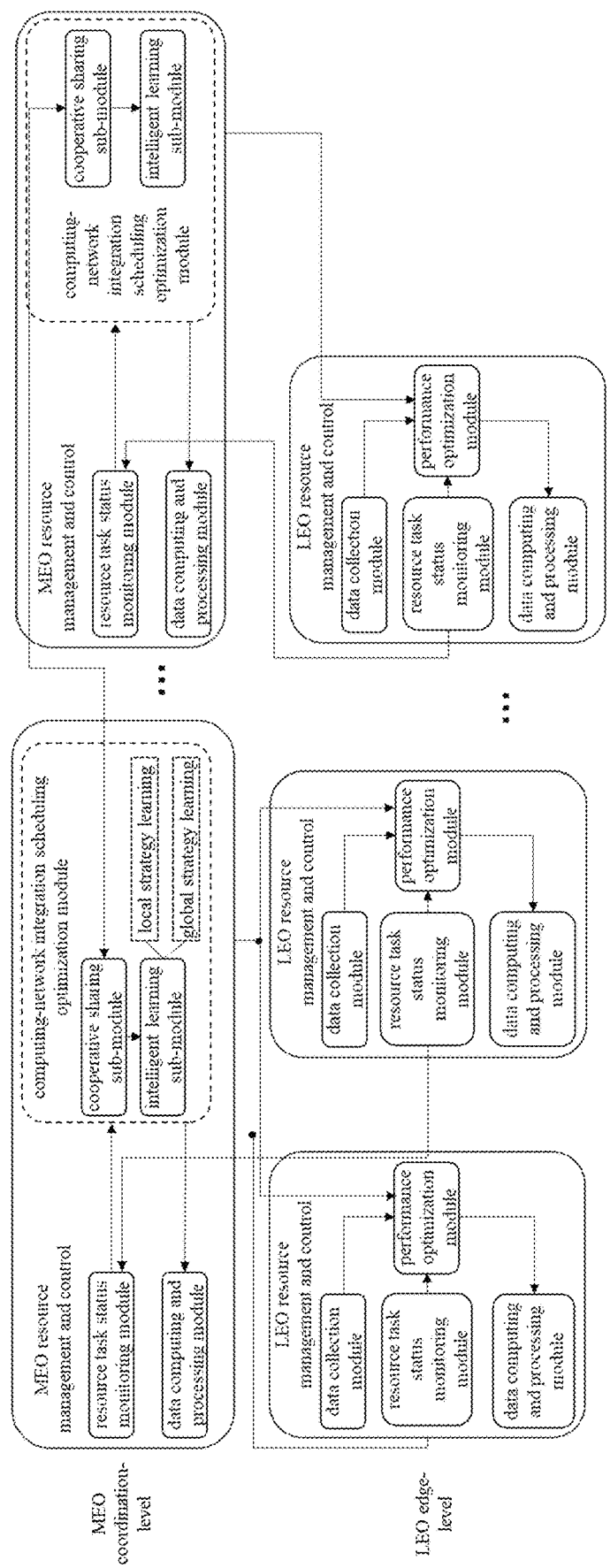
FIG. 2 illustrates another schematic architectural diagram of the system for operation, maintenance and resource management of mega-constellation based on computing-networking integration according to the embodiment of the disclosure.

In an embodiment, FIG. 2 illustrates another schematic architectural diagram of the system for operation, maintenance and resource management of mega-constellation based on computing-networking integration according to an embodiment of the disclosure. As illustrated in FIG. 2, each of the MEO satellites includes a resource task status monitoring module, a data computing and processing module, and a computing-networking integration scheduling optimization module. The resource task status monitoring module is configured (i.e., structured and arranged) to acquire resource usages and computing task execution statuses of the MEO satellite itself and each of the multiple LEO satellites managed by the MEO satellite within each time slot t of each scheduling cycle, to thereby obtain the resource task status of the MEO satellite in the time slot t. It should be noted that, the resource usages status includes remaining power and communication resource, and the computing task execution status includes whether the MEO satellite is executing data computation on the computing task, remaining data volume of the computing task to be computed, and so on. In the disclosure, the resource task status $s_{m_k}^t$ of each of the MEO satellites in the time slot t includes: energy state $B_{m_k}^t$, link state $H_{m_k}^t$, and on-board task data state F of the MEO satellite in the time slot t. The energy state of the MEO satellite in the time slot t represents remaining power of the MEO satellite in the time slot t; the link state of the MEO satellite in the time slot t represents a sum of link capacities on the communication links between the MEO satellite and the multiple LEO satellites managed by the MEO satellite in the time slot t; and the on-board task data state of the MEO satellite in the time slot t represents a sum of data volume of computing tasks of the multiple LEO satellite managed by the MEO satellite in the time slot t. In addition, in some embodiments, the resource task status monitoring module, the data computing and processing module, and the computing-networking integration scheduling optimization module of each of the MEO satellites are embodied by at least one processor and at least one memory coupled to the at least one processor, and the at least one memory is stored with computer programs executable by the at least one processor.

The data computing and processing module is configured to: when needing to perform data computation on the computing task of each of the multiple LEO satellites managed by the MEO satellite in the time slot t, receive the data of the computing task of each of the multiple LEO satellites managed by the MEO satellite, and perform computation on the corresponding data volume of the computing task of each of the multiple LEO satellites managed by the MEO satellite in the time slot t based on the data volume that needs to be computed. It should be noted that, when needing to perform the data computation on the computing task of each of the multiple LEO satellites managed by the MEO satellite in a fourth certain time slot, the MEO satellite acquires the corresponding data volume of the computing task of each of the multiple LEO satellites managed by the MEO satellite and performs computation on the corresponding data volume of the computing task of each of the multiple LEO satellites managed by the MEO satellite. The computing-networking integration scheduling optimization module is configured to train a resource scheduling information generation network by using local reinforcement learning and federated learning methods to thereby obtain the trained resource scheduling information generation network, share and aggregate network parameters of the resource scheduling information generation network with remaining (K-1) number of MEO satellites during training the resource scheduling information generation network, generate the resource scheduling information for the time slot t based on the resource task status of the MEO satellite itself in the time slot t by using the trained resource scheduling information generation network, and transmit the resource scheduling information for the time slot t to each of the multiple LEO satellites managed by the MEO satellite in the time slot t. In an embodiment, as illustrated in FIG. 2, the computing-networking integration scheduling optimization module includes an intelligent learning sub-module and a cooperative sharing sub-module. The intelligent learning sub-module is configured to train the resource scheduling information generation network by using the local reinforcement learning and federated learning methods to thereby obtain the trained resource scheduling information generation network, and generate the resource scheduling information for the time slot t based on the resource task status of the MEO satellite itself in the time slot t by using the trained resource scheduling information generation network. The cooperative sharing sub-module is configured to share and aggregate network parameters of the resource scheduling information generation network with the remaining (K-1) number of MEO satellites during training the resource scheduling information generation network, and transmit the resource scheduling information for the time slot t to each of the multiple LEO satellites managed by the MEO satellite in the time slot t.

In the disclosure, as illustrated in FIG. 2, each of the LEO satellites includes a data collection module, a resource task status monitoring module, and a data computing and processing module. The data collection module is configured to collect the data of the computing task from the surrounding environment of the LEO satellite to thereby obtain collected data. The resource task status monitoring module is configured to acquire statuses of computing resource, communication resource and computing task execution of the LEO satellite itself in real-time. The first data computing and processing module is configured to process the collected data and execute edge computing task. On this basis, in some embodiment, when performing the data computation based on real-time resource scheduling information, each LEO satellite of the multiple LEO satellites managed by a same MEO satellite can perform coordinative computation with rest of LEO satellites in the multiple LEO satellites managed by the same MEO satellite by using algorithms in related art. On this basis, as illustrated in FIG. 2, each of the LEO satellites further includes a performance optimization module. The performance optimization module is configured to obtain, by using LEO satellite coordinative scheduling method in related art, working parameters of the LEO satellite itself and resource scheduling strategies for other LEO satellites based on the statuses of computing resource, communication resource and computing task execution of the LEO satellite itself, so as to improve performance of the system for operation, maintenance and resource management of mega-constellation. It should be noted that, the working parameters of the LEO satellite itself and the resource scheduling strategies for other LEO satellites need to be determined according to specific algorithm in related art used by the LEO satellite, and are not limited in the disclosure. On a basis of introducing a computing-communication coordination mechanism and a strategic parameter coordination mechanism between MEO satellites, the disclosure can further improve task scheduling ability of a whole satellite network by introducing a coordinative scheduling management and control mechanism for inter-layer satellites. In addition, in some embodiments, the data collection module, the resource task status monitoring module, and the data computing and processing module of each of the LEO satellites are embodied by at least one processor and at least one memory coupled to the at least one processor, and the at least one memory is stored with computer programs executable by the at least one processor.

In the disclosure, the trained resource scheduling information generation network is trained by the local reinforcement learning and federated learning methods with an optimization objective of minimizing energy consumption of the system for operation, maintenance and resource management of mega-constellation in one scheduling cycle. Energy constraint for each of the LEO satellites, energy constraint for each of the MEO satellites, computing constraint for each of the LEO satellites, computing constraint for each of the MEO satellites and communication constraint for each of the LEO satellites are taken as constraints of the optimization objective. In an embodiment, a resource scheduling information generation network is Actor network.

In an embodiment, the energy constraint for each of the LEO satellites is expressed by formula (1), the energy constraint for each of the MEO satellites is expressed by formula (2):

$$EB_{l_n}^{max} \cdot (1-\Gamma_L) \le EB_{l_n,t} + EB_{l_n,t}^h - \left(E_{l_n,t}^{Ltr} + E_{l_n,t}^{comp}\right) \le EB_{l_n}^{max} \quad \text{formula (1)}$$

$$EB_{m_k}^{max}(1-\Gamma_M) \le EB_{m_k,t} + EB_{m_k,t}^h - \left(E_{m_k,t}^{Mre} + E_{m_k,t}^{comp}\right) \le EB_{m_k}^{max} \quad \text{formula (2)}$$

where, $l_n \in L$, $t \in \{1, \ldots T\}$, $m_k \in M$, L represents an LEO satellite set consisting of the LEO satellites N in quantity in the system for operation, maintenance and resource management of mega-constellation, $l_n$ represents an n-th LEO satellite of the LEO satellite set, a value of n is one of $1,2,\ldots,N$, t represents each time slot in one scheduling cycle T, M represents an MEO satellite set consisting of the MEO satellites K in quantity in the system for operation, maintenance and resource management of mega-constellation; $m_k$ represents an m-th MEO satellite of the MEO satellite set, a value of m is in one of $1, 2, \ldots, K$, $EB_{l_n}^{max}$ represents a maximum battery capacity of the n-th LEO satellite, $\Gamma_L$ represents a percentage of maximum discharge depth of the LEO satellite, the percentage of maximum discharge depth describes a lowest voltage level to which a battery can be safely discharged during use, that is, exceeding the maximum discharge depth may lead to a decrease in battery capacity or performance degradation, $EB_{l_n,t}$ represents an existing power of the n-th LEO satellite in each time slot, $EB_{l_n,t}^h$ represents a charged power of the n-th LEO satellite in each time slot, $EB_{l_n,t}^{Ltr}$ represents a transmitting energy consumption of the n-th LEO satellite in each time slot, $EB_{l_n,t}^{comp}$ represents a computing energy consumption of the n-th LEO satellite in each time slot; $EB_{m_k}^{max}$ represents a maximum battery capacity of the m-th MEO satellite, $\Gamma_M$ represents a percentage of maximum discharge depth of the MEO satellite, $EB_{m_k,t}$ represents an existing power of the m-th MEO satellite in each time slot, $EB_{m_k,t}^h$ represents a charged power of the m-th MEO satellite in each time slot, $E_{m_k,t}^{Mre}$ represents a receiving energy consumption of the m-th MEO satellite in each time slot, and $E_{m_k,t}^{comp}$ represents a computing energy consumption of the m-th MEO satellite in each time slot. It should be noted that, in the system for operation, maintenance and resource management of mega-constellation, charged power of each satellite in each time slot and link capacities between satellites need to be obtained in advance. In an embodiment, the charged power of each satellite in each time slot and the link capacities between satellites can be obtained by pre-acquiring a satellite energy acquisition matrix and a satellite link capacity matrix of the system for operation, maintenance and resource management of mega-constellation within a required time period. The satellite link capacity matrix includes a link capacity matrix between all LEO satellites and all MEO satellites in the system for operation, maintenance and resource management of mega-constellation in each time slot of each scheduling cycle, and each element in the link capacity matrix represents a link capacity between an LEO satellite and an MEO satellite in a corresponding time slot, or a link capacity between two MEO satellites. In the link capacity matrix, 0 indicates that corresponding satellites are not visible to each other, and other values greater than 0 in the link capacity matrix represent the link capacity between the corresponding satellites. The satellite energy acquisition matrix includes a satellite energy acquisition matrix of LEO satellite and a satellite energy acquisition matrix of MEO satellite. The satellite energy acquisition matrix of LEO satellite includes a dynamic energy acquisition matrix of the LEO satellites in the system for operation, maintenance and resource management of mega-constellation in each time slot of each scheduling cycle. The satellite energy acquisition matrix of MEO satellite includes a dynamic energy acquisition matrix of the MEO satellites in the system for operation, maintenance and resource management of mega-constellation in each time slot of each scheduling cycle. Each element in the dynamic energy acquisition matrix of the LEO satellites represents a charged power of a corresponding LEO satellite in a corresponding time slot, when a certain element is 0, it indicates that the corresponding LEO satellite is covered by shadow of the Earth during the corresponding time slot and cannot obtain solar energy. Principles of the dynamic energy acquisition matrix of the MEO satellites are the same as that of the dynamic energy acquisition matrix of the LEO satellites.

In an embodiment, the computing constraint for each of the MEO satellites is expressed by formula (3):

$$y_{m_k,t} \le comp_M^{max} \quad \text{formula (3)}$$

where, $y_{m_k,t}$ represents a data volume processed by the m-th MEO satellite in each time slot t, and $comp_M^{max}$ represents an maximum computing upper limit of the MEO satellite.

In an embodiment, the computing constraint for each of the LEO satellites is expressed by formula (4):

$$y_{l_n,t} \le comp_L^{max} \quad \text{formula (4)}$$

where, $y_{l_n,t}$ represents a data volume processed by the n-th LEO satellite in each time slot t, and $comp_L^{max}$ represents an maximum computing upper limit of the LEO satellite.

In an embodiment, the communication constraint for each of the LEO satellite is expressed by formula (5):

$$x_{l_n^t j^t} \le C(l_n, j, t) \quad \text{formula (5)}$$

where, j represents an MEO satellite managing the n-th LEO satellite $l_n$ in the time slot t, $C(l_n, j, t)$ represents a link capacity on a communication link from $l_n$ to j in the time slot t, and $x_{l_n^t j^t}$ represents a data volume transmitted from $l_n$ to j in the time slot t.

In an embodiment, an energy consumption of the system for operation, maintenance and resource management of mega-constellation is expressed by formula (6), formula (7), formula (8), formula (9) and formula (10):

$$\min_{\Pi} E^{con} = \quad \text{formula (6)}$$

$$\min \sum_{t} \left( \sum_{l_n \in L} \left( E_{l_n,t}^{Ltr} + E_{l_n,t}^{comp} \right) + \sum_{m_k \in M} \left( E_{m_k,t}^{Mre} + E_{m_k,t}^{comp} \right) \right)_{\Pi(S^t)}$$

$$E_{l_n,t}^{Ltr} = \left( \sum_{j \in M} \frac{P_L^{tr} x_{l_n j}^{j}}{C(l_n, j, t)} \right) \tau \quad \text{formula (7)}$$

$$E_{l_n,t}^{comp} = \kappa_l \left( \lambda_{l_n,t}^{L} \right)^3 \tau \quad \text{formula (8)}$$

$$E_{m_k,t}^{Mre} = \left( \sum_{j' \in L} \frac{P_M^{re} x_{j' m_k}^{t}}{C(j', m_k, t)} \right) \tau \quad \text{formula (9)}$$

$$E_{m_k,t}^{comp} = \kappa_m \left( \lambda_{m_k,t}^{M} \right)^3 \tau \quad \text{formula (10)}$$

where, $\Pi$ represents a set of scheduling strategies of all MEO satellites obtained by the trained resource scheduling information generation network, and the scheduling strategies are the network parameters of the trained resource scheduling information generation network; $E^{con}$ represents a total energy consumption of the system for operation, maintenance and resource management of mega-constellation in one scheduling cycle;

$$\min_{\Pi} E^{con}$$

represents a minimum total energy consumption of the system for operation, maintenance and resource management of mega-constellation in one scheduling cycle, $S^t$ represents a resource task status of an MEO satellite in each time slot t, $\Pi(S^t)$ represents the set of scheduling strategies of all MEO satellites under status $S^t$, $P_L^{tr}$ represents a transmitting power of the n-th LEO satellite, $\tau$ represents a slot length of the time slot t, $\kappa_l$ represents a hardware computing coefficient of the n-th LEO satellite, $\lambda_{l_n,t}^{L}$ represents a computing rate of the n-th LEO satellite in each time slot t, $P_M^{re}$ represents a receiving power of the m-th MEO satellite, j' represents an LEO satellite in the LEO satellite set L that is managed by the m-th MEO satellite in the time slot t and transmits data to the m-th MEO satellite $m_k$, C(j', $m_k$, t) represents a link capacity on a communication link from j' to $m_k$ in the time slot t, $x_{j' m_k}^{t}$ represents a data volume transmitted from j' to $m_k$ in the time slot t, Km, represents a hardware computing coefficient of $m_k$, and $\lambda_{m_k,t}^{M}$ represents a computing rate of the m-th MEO satellite $m_k$ in each time slot t.

The disclosure takes into account dynamic fluctuations in energy acquisition caused by satellites periodically switching between shadow area of the Earth and direct sunlight area. Based on these actual fluctuation characteristics, the disclosure models dynamic energy consumption and acquisition of the satellites during a computing-network coordination process. Based on the modeling of the dynamic energy consumption and acquisition of the satellites during the computing-network coordination process, the optimization objective and the constraints thereof are constructed when training the resource scheduling information generation network. In this way, the disclosure is more efficient and more in line with real application environment. As a result, high-energy-consuming computing tasks in actual satellite network scenarios can be completed efficiently, and a situation of performance degradation or service interruptions during on-board computing services with high energy consumption is avoided.

In some embodiments, the trained resource scheduling information generation network deployed on each MEO satellite is trained by the following training method S101 through S106. The training method is described in detail as follows with the MEO satellite $m_k$ as an example.

S101, the resource task status $s_{m_k}^{c}$ of the MEO satellite $m_k$ in a c-th time slot is acquired at the c-th time slot in a k-th round of training. Each round of training corresponds to one scheduling cycle, each scheduling cycle has T numbers of time slots. Training is conducted once every preset update step length $T_{Train}$ of time slots. When c=1, the resource task status $s_{m_k}^{c}$ of the MEO satellite $m_k$ in the c-th time slot is a preset status.

It should be noted that, in each scheduling cycle, the training is conducted once every preset update step length $T_{Train}$ of time slots. k is a positive integer, a value of k starts from 1, for example, k=1, 2, . . . , Z, and Z is a preset positive integer. The resource task status of the MEO satellite $m_k$ in a first time slot acquired at the first time slot in a first round of training is the preset status. The preset status can be set according to actual needs and is not limited by the disclosure.

S102, resource scheduling information $a_{m_k}^{c}$ for the c-th time slot is determined based on a resource scheduling information generation network obtained in a (c-1)-th time slot and the resource task status $s_{m_k}^{c}$ in the c-th time slot. When c=1, the resource scheduling information generation network obtained in the (c-1)-th time slot is a resource scheduling information generation network obtained by a last one time of training in a (k-1)-th round of training.

In an embodiment, the resource task status $s_{m_k}^{c}$ in the c-th time slot is input into the resource scheduling information generation network obtained in the (c-1)-th time slot, and the resource scheduling information $a_{m_k}^{c}$ for the c-th time slot is output by the resource scheduling information generation network obtained in the (c-1)-th time slot.

S103, a reward $r_{m_k}^{c}$ in the c-th time slot and a resource task status $s_{m_k}^{c+1}$ in a (c+1)-th time slot of the MEO satellite $m_k$ are determined based on the resource scheduling information $a_{m_k}^{c}$ for the c-th time slot.

In an embodiment, the MEO satellite $m_k$ performs corresponding data computation based on the resource scheduling information $a_{m_k}^{c}$ for the c-th time slot, to thereby obtain the reward $r_{m_k}^{c}$ in the c-th time slot and the resource task status $s_{m_k}^{c+1}$ in the (c+1)-th time slot of the MEO satellite $m_k$, and the resource scheduling information $a_{m_k}^{c}$ for the c-th time slot is calculated by formula (11):

$$a_{m_k}^{c} = -E_{m_k,c}^{local} = \left( E_{m_k,c}^{Mre} + E_{m_k,c}^{comp} \right) + \sum_{l_n \in L_{m_k,c}} \left( E_{l_n,c}^{Ltr} + E_{l_n,c}^{comp} \right) \quad \text{formula (11)}$$

where, $E_{m_k,c}^{local}$ represents a total energy consumption of a local system constituted by the MEO satellite $m_k$ in the c-th time slot and LEO satellites managed by the MEO satellite $m_k$ in the c-th time slot, $E_{m_k,c}^{Mre}$ represents a receiving energy consumption of the MEO satellite $m_k$ in the c-th time slot, $E_{m_k,c}^{Mre}$ represents a computing energy consumption of the MEO satellite $m_k$ in the c-th time slot, $L_{m_k,c}$ represents an LEO satellite set constituted by the LEO satellites managed by the MEO satellite $m_k$ in the c-th time slot, $E_{l_n,c}^{Ltr}$ represents a transmitting energy consumption in the c-th time slot of each of the LEO satellites managed by the MEO satellite $m_k$ in the c-th time slot, and $E_{l_n,c}^{comp}$ represents a computing energy consumption in the c-th time slot of each of the LEO satellites managed by the MEO satellite $m_k$ in the c-th time slot. After the reward $r_{m_k}^c$ in the c-th time slot and the resource task status $s_{m_k}^{c+1}$ in the (c+1)-th time slot of the MEO satellite $m_k$ are determined based on the resource scheduling information $a_{m_k}^c$ for the c-th time slot, the step S103 further includes taking the resource task status $s_{m_k}^c$ in the c-th time slot, the resource task status $s_{m_k}^{c+1}$ in the (c+1)-th time slot, the resource scheduling information $a_{m_k}^c$ for the c-th time slot and the reward $r_{m_k}^c$ in the c-th time slot as an empirical sample $<s_{m_k}^c, a_{m_k}^c, r_{m_k}^c, s_{m_k}^{c+1}>$, and storing the empirical sample into an empirical buffer of the MEO satellite $m_k$.

S104, whether to update network parameters of current resource scheduling information generation network is determined based on c, the preset update step length $T_{Train}$ and the resource scheduling information generation networks obtained in the (c-1)-th time slot. A resource scheduling information generation network in the c-th time slot is obtained.

In an embodiment, a remainder operation is performed on c and the preset update step length $T_{Train}$ to thereby obtain a second operation result. When the second operation result is 0, a loss function and empirical samples in the empirical buffer are used to update network parameters of current Actor network, to thereby obtain an Actor network for the c-th time slot. Subsequently, the loss function and the empirical samples in the empirical buffer are used to update network parameters of current Critic network, to thereby obtain a Critic network for the c-th time slot. When the second operation result is not 0, updating network parameters is not conducted, and an Actor network for the (c-1)-th time slot is directly taken as the Actor network for the c-th time slot.

In an embodiment, when updating network parameters of the Actor network, a loss is calculated based on the empirical samples taking from the empirical buffer of the MEO satellite $m_k$ and a loss function $\iota_{ac}(\theta_{m_k})$. Network parameters $\theta'_m$ of the Actor network for the c-th time slot is obtained by using a gradient descent method. The Actor network for the c-th time slot is obtained by using the network parameters $\theta'_{m_k}$ of the Actor network for the c-th time slot.

In an embodiment, the loss function $\iota_{a_c}(\theta_{m_k})$ is expressed by formula (12) and formula (13):

$$\ell_{ac}(\theta_{m_k}) = \\ E\left[\begin{array}{c} \min(Ra(\theta_{m_k}) \cdot \\ Adv(s_{m_k}^c, a_{m_k}^c), clip(Ra(\theta_{m_k}), 1-\varepsilon, 1+\varepsilon) \cdot Adv(s_{m_k}^c, a_{m_k}^c)) \end{array}\right] \quad \text{formula (12)}$$

$$Adv(s_{m_k}^c, a_{m_k}^c) = Q(s_{m_k}^c, a_{m_k}^c) - V(s_{m_k}^c) \quad \text{formula (13)}$$

where, $Adv(s_{m_k}^c, a_{m_k}^c)$ is an advantage function under $s_{m_k}^c$ and $a_{m_k}^c$, the advantage function measures a quality of selecting specific actions (i.e., specific resource scheduling information) compared to an average selection of all possible actions in a given state, that is, the advantage function measures whether a reward of taking $a_{m_k}^c$ under $s_{m_k}^c$ is high or low relative to an average level. $Q(s_{m_k}^c, a_{m_k}^c)$ is an action value function of taking $a_{m_k}^c$ under $s_{m_k}^c$ and represents an expected value of all possible future cumulative rewards after taking $a_{m_k}^c$ under $s_{m_k}^c$. $V(s_{m_k}^c)$ is a state value function under $s_{m_k}^c$, and represents an expected value of all possible future cumulative rewards under $s_{m_k}^c$.

$$Ra(\theta_{m_k}) = \frac{\pi_{\theta_{m_k}}^{new}(a_{m_k}^c | s_{m_k}^c)}{\pi_{\theta_{m_k}}^{old}(a_{m_k}^c | s_{m_k}^c)}$$

represents a strategy probability ratio, the strategy represents the network parameters of the Actor network, the strategy probability ratio represents a probability ratio of a new strategy $$\pi_{\theta_{m_k}}^{new}(a_{m_k}^c | s_{m_k}^c)$$

to an old strategy $$\pi_{\theta_{m_k}}^{old}(a_{m_k}^c | s_{m_k}^c)$$

in same state and action. When current time slot is the c-th time slot, the new strategy is the network parameters of the Actor network for the c-th time slot, and the old strategy is network parameters of the Actor network for the (c-1)-th time slot. clip($Ra(\theta_{m_k})$,1–ε, 1+ε) represents clipping the strategy probability ratio, a clipping threshold e is a hyperparameter used to control a step size of strategy update. By applying clipping operation, the strategy probability ratio is restricted in a range of [1–ε,1+ε] to prevent the step size of strategy update from becoming too large. E[.] represents a mathematical expectation.

In an embodiment, $\theta'_{m_k}$ is expressed by formula (14):

$$\theta'_{m_k} = \theta_{m_k} + \iota_{ac} \nabla_{\theta_{m_k}} \ell_{ac}(\theta_{m_k}) \quad \text{formula (14)}$$

where, $\theta'_{m_k}$ represents the network parameters of the Actor network for the (c−1)-th time slot, $t_{ac}$ represents a learning rate used to control a step size of parameter update, and $$\nabla_{\theta_{m_k}}$$

represents a derivative of $\theta_{m_k}$.

In an embodiment, when updating network parameters of the Critic network, a loss is calculated based on the empirical samples taking from the empirical buffer of the MEO satellite $m_k$ and a loss function $\iota_{cr}(\vartheta)$. Network parameters $\vartheta'_{m_k}$ of the Critic network for the c-th time slot is obtained by using the gradient descent method. The Critic network for the c-th time slot is obtained by using the network parameters $\vartheta'_{m_k}$ of the Critic network for the c-th time slot.

In an embodiment, the loss function $\iota_{cr}(\vartheta)$ is expressed by formula (15) and formula (16):

$$\ell_{cr}(\vartheta) = E\left[\left(V_\vartheta(s_{m_k}^c) - V_{tar}\right)^2\right] \quad \text{formula (15)}$$

$$V_{tar} = R + \gamma V_\vartheta(s_{m_k}^{c+1}) \quad \text{formula (16)}$$

where, $V_{tar}$ represents an estimated value of an expected cumulative reward after taking a certain action in current state, and is a target value; R represents current reward; $V_\vartheta(s_{m_k}^{c+1})$ represents an estimated value of a reward of the Critic network for a next state $s_{m_k}^{c+1}$, represents an expected value of all possible future cumulative rewards starting from the next state $s_{m_k}^{c+1}$, and is an estimation of Critic network output for the next state $s_{m_k}^{c+1}$; $\gamma$ is a discount factor used to measure importance of $V_\vartheta(s_{m_k}^{c+1})$, and the closer the discount factor is to 1, the greater a proportion of $V_\vartheta(s_{m_k}^c)$ in the target value; and $\iota_{cr}(\vartheta)$ represents a mean square error between the estimated value $V_\vartheta(s_{m_k}^c)$ of the Critic network output and the target value $V_{tar}$. During the training process, the Critic network adjusts network parameters thereof by minimizing the mean square error between the estimated value $V_\vartheta(s_{m_k}^c)$ and the target value $V_{tar}$, to thereby making the estimated value $V_\vartheta(s_{m_k}^c)$ closer to the target value $V_{tar}$.

In an embodiment, $\vartheta'_{m_k}$ is expressed by formula (17):

$$\vartheta'_{m_k} = \vartheta_{m_k} - \iota_{cr} \nabla_{\vartheta_{m_k}} \ell_{cr}(\vartheta_{m_k}) \qquad \text{formula (17)}$$

where, $\vartheta_{m_k}$ represents network parameters of the Critic network for the (c-1)-th time slot, $t_{cr}$ represents a learning rate used to control a step size of parameter update, and $$\nabla_{\vartheta_{m_k}}$$

represents a derivative of $\vartheta_{m_k}$.

S105, whether to perform network parameter aggregation with network parameters of remaining (K-1) number of MEO satellites is determined based on c, a preset aggerate step length $T_f$ and the resource scheduling information generation networks obtained in the c-th time slot. A latest resource scheduling information generation network in the c-th time slot is obtained.

In an embodiment, the remainder operation is performed on c and the preset aggerate step length $T_f$, to thereby obtain a first operation result. When the first operation result is 0, Actor networks of the remaining (K-1) number of MEO satellites in the c-th time slot are obtained; the network parameters of the resource scheduling information generation network in the c-th time slot of the MEO satellite $m_k$ are aggerated with network parameters of the Actor networks of the remaining (K-1) number of MEO satellites in the c-th time slot by using a preset aggregation update matrix $\Omega$, to thereby obtain aggregated network parameters in the c-th time slot of the MEO satellite m; the Actor network in the c-th time slot of the MEO satellite $m_k$ is updated by using the aggregated network parameters in the c-th time slot of the MEO satellite $m_k$, to thereby obtain a latest Actor network in the c-th time slot of the MEO satellite $m_k$. When the first operation result is not 0, the Actor network in the c-th time slot of the MEO satellite $m_k$ is taken as the latest Actor network in the c-th time slot of the MEO satellite $m_k$. In an embodiment, the aggregated network parameters in the c-th time slot is expressed by formula (18) and formula (19):

$$\Theta^*(c) = \Theta(c) \cdot \Omega \qquad \text{formula (18)}$$

$$\Omega = \begin{bmatrix} \delta & \frac{1-\delta}{K-1} & \cdots & \frac{1-\delta}{K-1} \\ \frac{1-\delta}{K-1} & \delta & \cdots & \frac{1-\delta}{K-1} \\ \vdots & \vdots & \ddots & \vdots \\ \frac{1-\delta}{K-1} & \frac{1-\delta}{K-1} & \cdots & \delta \end{bmatrix} \qquad \text{formula (19)}$$

where, $\Theta^*(c)$ represents the aggregated network parameters in the c-th time slot, $\Theta(c)$ represents a set of network parameters of Actor networks in the c-th time slot of K number of MEO satellites, $\Omega$ represents the preset aggregation update matrix, and $\delta$ represents a federated aggregation factor. The federated aggregation factor $\delta$ represents a weight of each of elements on a diagonal, and usually indicates an extent to which each MEO satellite retains network parameters thereof.

$$\frac{1-\delta}{K-1}$$

is an off-diagonal element, and represents an influence of the remaining (K-1) number of MEO satellites on the network parameters of an MEO satellite that shares the network parameters thereof.

S106, a latest resource scheduling information generation network in the (c+1)-th time slot in the k-th round of training is continually determined based on the resource task status of the MEO satellite $m_k$ in the (c+1)-th time slot and the latest resource scheduling information generation network in the c-th time slot. The k-th round of training is completed until a T-th time slot in the k-th round of training is reached. A (k+1)-th round of training is continually conducted until an iteration termination condition is reached to thereby obtain the trained resource scheduling information generation network of the MEO satellite $m_k$.

For example, when a number of training rounds reaches a preset round threshold, it can be considered that the iteration termination condition is reached. Therefore, an Actor network obtained from a last time of training in a last training round can be taken as a trained Actor network of the MEO satellite $m_k$.

In an embodiment, K is a number of the MEO satellites deployed to minimize an overall scheduling complexity of the system for operation, maintenance and resource management of mega-constellation when the LEO satellites are N in quantity; and the overall scheduling complexity of the system for operation, maintenance and resource management of mega-constellation is expressed by formula (20) and formula (21):

$$\Psi = \psi \cdot K \qquad \text{formula (20)}$$

$$\psi = (N/K+1) * N/K + (N/K)^2 + N/K + \qquad \text{formula (21)}$$
$$(N/K+1)^3 * N/K + (L_{in}L_{hidden} + L_{hidden} * L_{hidden} +_{hidden} L_{out})$$

where, $\psi$ represents the overall scheduling complexity of the system for operation, maintenance and resource management of mega-constellation, yr represents a scheduling complexity of each of the MEO satellites when managing the multiple LEO satellites, L represents a dimension of input data of the trained resource scheduling information generation network, $L_{hidden}$ represents a number of neurons of a hidden layer of the trained resource scheduling information generation network, and $L_{out}$ represents a dimension of output data of the trained resource scheduling information generation network, for example, $L_{out}$ is 6. In an expression of ψ, excepting for four terms of $(L_{in}L_{hidden}+L_{hidden}*L_{hidden}+L_{hidden}L_{out})$, other terms constitute a scheduling complexity when performing coordinative computing between multiple LEO satellites managed by each of the MEO satellites. "·" and "*" are both multiplication symbols. In an embodiment, the following table 1 shows an optimal deployment situation of the MEO satellites determined by using the expression of the overall scheduling complexity of the system for operation, maintenance and resource management of mega-constellation under different LEO satellite numbers, where MEO* represents an optimal MEO satellite deployment number.

TABLE 1 optimal MEO deployment number
corresponding to different LEO numbers

| LEO number | MEO* |
| --- | --- |
| 20 | 3 |
| 50 | 6 |
| 100 | 11 |
| 200 | 23 |
| 300 | 34 |
| 400 | 46 |
| 500 | 57 |
| 600 | 68 |
| 700 | 80 |
| 800 | 91 |
| 900 | 103 |
| 1000 | 114 |

Methods in related art ignore relationship between the scheduling complexity of an operation and maintenance and resource management architecture for mega-constellations and number and scale of satellites in the satellite network during actual operations. The disclosure provides a calculation model of the overall scheduling complexity of the system for operation, maintenance and resource management of mega-constellation based on the system for operation, maintenance and resource management of mega-constellation based on computing-networking integration provided in the disclosure. The calculation model enables the system for operation, maintenance and resource management of mega-constellation based on computing-networking integration provided by the disclosure to obtain the optimal MEO satellite deployment number with low scheduling complexity under different LEO satellite numbers, so that the disclosure can provide guidance for construction and deployment of actual satellite constellations.

Figure 3:
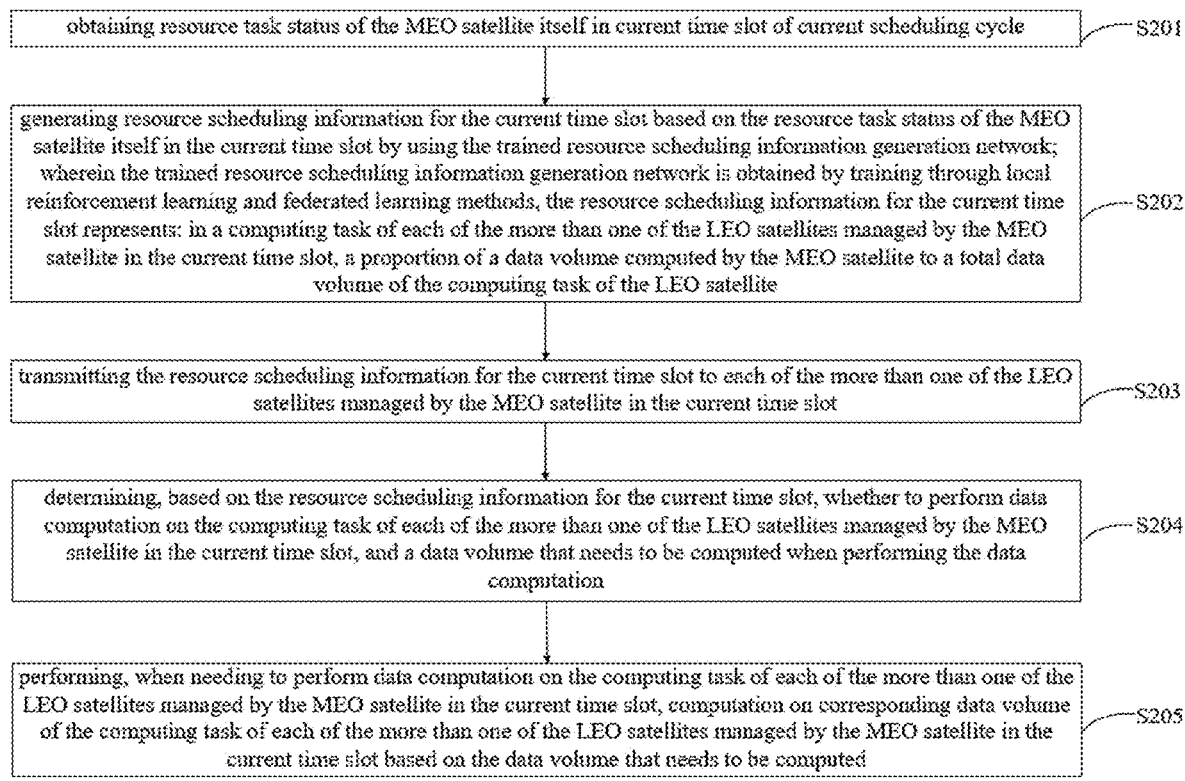
FIG. 3 illustrates a schematic flowchart of a method for operation, maintenance and resource management of mega-constellation based on computing-networking integration according to an embodiment of the disclosure.

A method for operation, maintenance and resource management of mega-constellation based on computing-networking integration provided by the disclosure, applied to each of the MEO satellites in the system for operation, maintenance and resource management of mega-constellation, as illustrated in FIG. 3, includes the following step S201 through S205.

S201, the MEO satellite obtains a resource task status of its own in current time slot of current scheduling cycle.

S202, the MEO satellite generates scheduling information for the current time slot based on the resource task status of its own in the current time slot by using the trained resource scheduling information generation network. The trained resource scheduling information generation network is obtained by training through the local reinforcement learning and federated learning methods. The resource scheduling information for the current time slot represents: in the computing task of each of the multiple LEO satellites managed by the MEO satellite in the time slot, a proportion of the data volume computed by the MEO satellite to the total data volume of the computing task of the LEO satellite.

S203, the MEO satellite transmits the resource scheduling information for the current time slot to each LEO of the multiple satellites managed by the MEO satellite in the current time slot.

S204, whether to perform data computation on the computing task of each of the multiple LEO satellites managed by the MEO satellite in the current time slot and a data volume that needs to be computed when performing the data computation are determined based on the resource scheduling information for the current time slot.

S205, when needing to perform the data computation on the computing task of each the multiple LEO satellites managed by the MEO satellite in the current time slot, the MEO satellite performs the data computation on corresponding data volume of the computing task of each of the multiple LEO satellites managed by the MEO satellite in the current time slot based on the data volume that needs to be computed.

It should be noted that, specific principle of the method for operation, maintenance and resource management of mega-constellation based on computing-networking integration has been explained in detail in description for the system for operation, maintenance and resource management of mega-constellation based on computing-networking integration, and will not be repeated here.

Compared with related art, the disclosure has the following beneficial effects.

(1) Aiming at a multi-layer complex structure and computation management and control of mega-constellations, the disclosure provides the system and the method for operation, maintenance and resource management of mega-constellation based on computing-networking integration. The system for operation, maintenance and resource management of mega-constellation includes a two-level management and control architecture, namely the MEO satellite coordination-level management and control architecture and the LEO satellite edge-level management and control architecture. By introducing the computing-communication coordination mechanism, the coordinative scheduling management and control mechanism for inter-layer satellites and the strategic parameter coordination mechanism between MEO satellites, dynamic scheduling and efficient utilization of resource are reached. The MEO satellite coordination-level management and control architecture is mainly responsible for global operation and maintenance as well as resource management and control of the whole satellite network, including allocation of computing tasks and comprehensive utilization of inter-layer resources. The LEO satellite edge-level management and control architecture focuses on the real-time computing of edge nodes and the real-time coordinative execution of communication tasks. These features enable the disclosure to carry out efficient computational scheduling in actual applications without relying on management and control of ground controllers, therefore achieving higher real-time performance and better resource management and control scheduling capabilities.

(2) Aiming at actual mega-constellation multi-layer satellite network scenarios, the disclosure takes into account dynamically uncertain computing tasks, dynamic fluctuations in processes of satellite energy acquisition and consumption and resource constraints. To ensure that computing tasks with high energy consumption can be efficiently completed in actual satellite network scenarios, the disclosure focuses on the dynamic fluctuations in energy acquisition caused by satellites periodically switching between the shadow area of the Earth and the direct sunlight area and arrival of the dynamically uncertain computing tasks, and constructs a computing-network coordination process of computing resource and communication resource and corresponding dynamic energy consumption and acquisition process for multi-layer mega-constellation. These features make the disclosure more efficient and more in line with real application environment.

(3) Different from planning technologies in related art, the disclosure makes decisions on a proportion of task data from LEO satellites to be assisted by MEO satellites for coordinative computation in each time slot through continuous learning, and at the same time, considers long-term optimal resource management and control decisions under dynamic task arrivals to achieve coordination between LEO satellite layer and MEO satellite layer. The disclosure achieves computing-network coordination between MEO satellites through sharing, interaction, and aggregation of strategy parameters (rather than relay transmission of task data), thereby reducing occupation of communication bandwidth and time delay and realizing computing-network coordination of the whole satellite network. The disclosure realizes efficient computing-networking integration management and control for the mega-constellation through efficient computing-network coordination between LEO-MEO layers and aggregation coordination of strategy parameters between the MEO satellites, and further improves the completed task data volume of the whole satellite network. This feature makes the disclosure have better dynamic decision-making ability of the whole satellite network and higher completed task data rate.

(4) Methods in related art ignores relationship between the scheduling complexity of an operation and maintenance and resource management architecture for mega-constellations and number and scale of satellites in the satellite network during actual operations. Aiming at the multi-layer complex structure and computation management and control problems of mega-constellations, the disclosure provides the system and the method for operation, maintenance and resource management of mega-constellation based on computing-networking integration. Based on the system and the method for operation, maintenance and resource management of mega-constellation, the optimal MEO satellite deployment number with low scheduling complexity under different LEO satellite numbers can be obtained, so that the disclosure can provide guidance for construction and deployment of actual satellite constellations.

Part of technical effects of the disclosure are verified by simulation experiments.

Simulation Scene

The simulation scene includes 144 LEO satellites with an orbital height of 780 kilometers (km) and 6 MEO satellites with an orbital height of 8000 km. Each satellite is equipped with edge computing and communication capabilities. The hardware computing coefficient $\kappa_l$ of each LEO satellite is $7\times10^{-26}$ J/cycle, the hardware computing coefficient $\kappa_m$ of each MEO satellite is $7\times10^{-24}$ J/cycle, J represents joule, cycle is revolution, and a hardware computing coefficient of a satellite represents how much energy is consumed within a single computer clock cycle. In the simulation scene, each of the LEO satellites can collect, transmit and process ecological monitoring data, the link capacity between satellites is 300 megabits per second (Mbps), the transmitting power of each LEO satellite is 8 watts (W), the receiving power of each LEO satellite is 10 W, a learning rate $\alpha=0.001$, a number of slot (i.e., scheduling cycle) T=120, the discount factor $\gamma$ is 0.99, a total number of training iteration IT=$6\times10^3$, the federated aggregation factor $\delta$ is 0.5, $T_f$ is 2, $T_{Train}$ is 4, and the clipping threshold $\varepsilon=0.1$.

Simulation Content and Results

Figure 4:
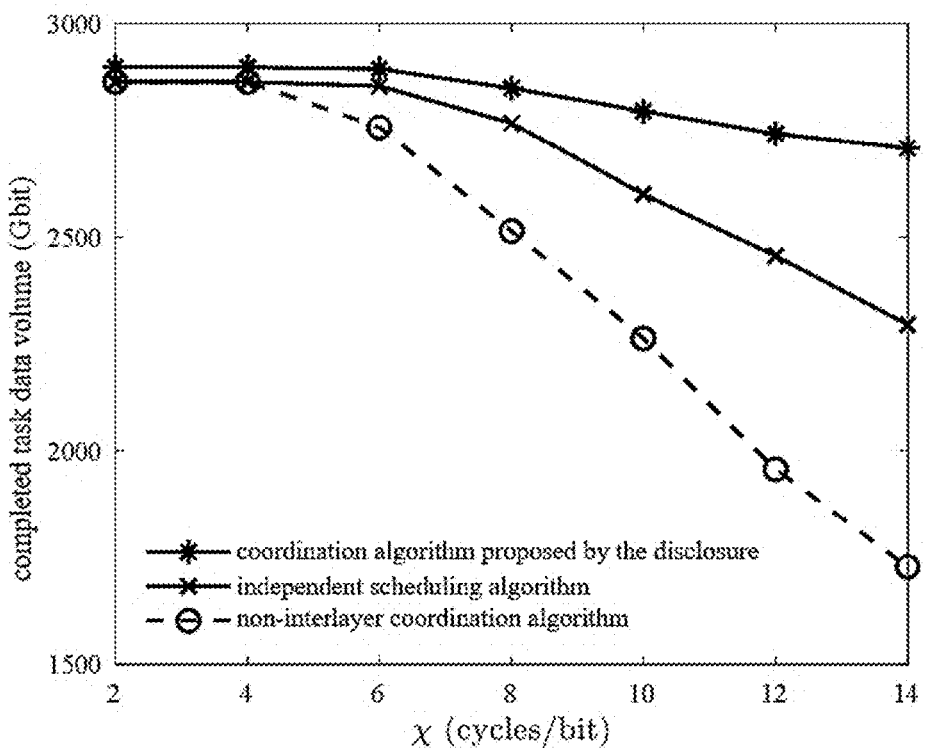
FIG. 4 illustrates a schematic diagram of completed task data volumes obtained through simulation experiments according to an embodiment of the disclosure.
Figure 5:
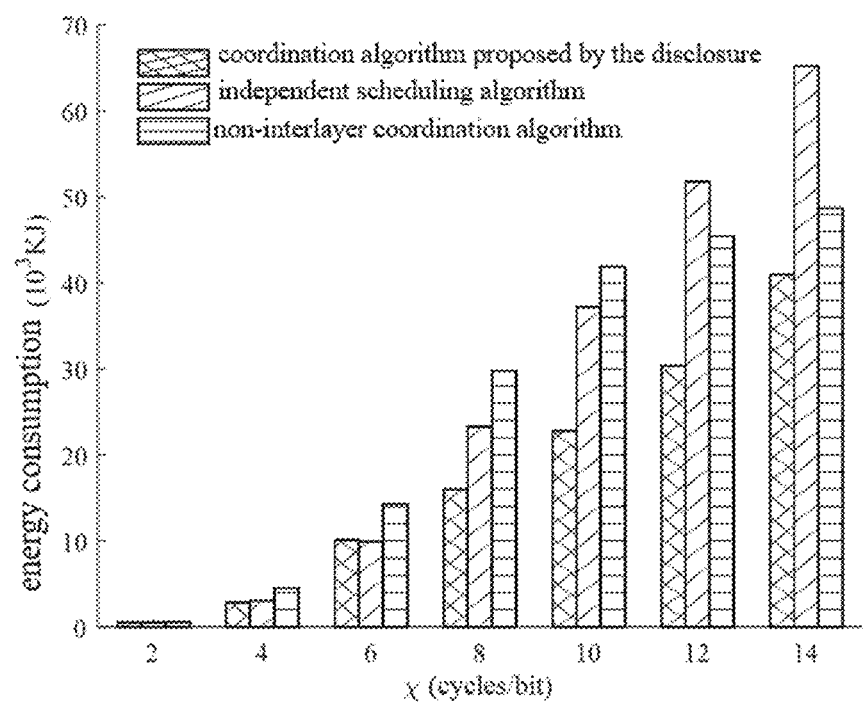
FIG. 5 illustrates a result diagram of energy consumption obtained through simulation experiments according to an embodiment of the disclosure.

The disclosure is compared with an independent management and control scheduling algorithm and a non-interlayer coordination algorithm. With an increase of task data computation requirement $\lambda$, completed task data volumes of the disclosure, the independent management and control scheduling algorithm and the non-interlayer coordination algorithm are illustrated in FIG. 4, and energy consumption results of the disclosure, the independent management and control scheduling algorithm and the non-interlayer coordination algorithm are illustrated in FIG. 5, where, "coordination algorithm proposed by the disclosure" in FIG. 4 and FIG. 5 represents the disclosure. A unit of task data computation requirement $\lambda$ is cycles/bit (number of cycles per bit), a unit of completed task data volumes is gigabit (Gbit), and a unit of energy consumption is kilojoule (Kj). In an embodiment, FIG. 4 illustrates the completed task data volumes of the disclosure, the independent management and control scheduling algorithm and the non-interlayer coordination algorithm with the increase of task data computation requirement $\lambda$. It can be clearly seen from FIG. 4, the disclosure, due to its ability to adapt to dynamic environments and achieve coordination through the MEO inter-satellite federation, is capable of completing the most tasks under various sudden task volume scenarios. Compared with other methods, the disclosure can significantly increase the completed task data volumes. To further explore and explain advantages of the disclosure, the disclosure further studies the energy consumption, as illustrated in FIG. 5. It can be seen from a combination of FIG. 4 and FIG. 5, when the task data computation requirement $\lambda$ is small, the completed task data volumes of different algorithms under limited resources is similar due to sufficient resource at this time. When the task data computation requirement $\lambda$ is big, the disclosure is capable of coordinating available communication and computing resources on different satellites through intelligent federation to complete more task data with lower resource consumption. Therefore, under condition of limited resources in reality, the disclosure completes more task data through intelligent coordination of communication and computing resources.

It should be noted that, terms "first" and "second" are only used for descriptive purposes, and cannot be understood as indicating or implying relative importance or implicitly indicating a number of indicated technical features. Therefore, features defined as "first" and "second" can include one or more features explicitly or implicitly. In description of the disclosure, "multiple" means two or more, unless otherwise specifically defined.

In description of the specification, descriptions referring to the terms "one embodiment", "some embodiments", "examples", "specific examples" or "some examples" mean that specific features or characteristics described in combination with this embodiment or example are included in at least one embodiment or example of the present invention. In the specification, schematic expressions of the aforementioned terms are not necessarily aimed at the same embodiment or example. Moreover, the specific features or characteristics described may be combined in a suitable manner in any one or more embodiments or examples. In addition, those skilled in the art can combine and associate different embodiments or examples described in this specification.

In the specification, a word "comprising" does not exclude additional elements or steps, and a use of "a" or "an" does not exclude a possibility of plurality. Certain measures are recorded in mutually different embodiments, but this does not mean that these measures cannot be combined to produce good results.

Aforementioned content is a further detailed description of the disclosure in combination with specific embodiments, but it should not be considered that specific implementation of the disclosure is limited thereto. All simple inferences or substitutions made by those skilled in the art without departing from concepts of the disclosure shall fall within a scope of protection of the disclosure.

What is claimed is:

1. An system for operation, maintenance and resource management of mega-constellation based on computing-networking integration, comprising: a medium earth orbit (MEO) satellite coordination-level management and control architecture with MEO satellites K in quantity and a low earth orbit (LEO) satellite edge-level management and control architecture with LEO satellites N in quantity; wherein the MEO satellites are connected to each other through communication links, the LEO satellites are connected to each other through the communication links, the MEO satellites are connected to the LEO satellites through the communication links, and each of the MEO satellites is configured to manage more than one of the LEO satellites in each time slot of each scheduling cycle;

wherein each of the LEO satellites is configured to: acquire data of a computing task during a preset time period, and in each time slot t of each scheduling cycle within the preset time period, determine, based on resource scheduling information for the time slot t transmitted by the MEO satellite, whether to perform data computation on the computing task in the time slot t, and a data volume that needs to be computed when performing the data computation, and perform computation on corresponding data volume of the computing task in the time slot t based on the data volume that needs to be computed; and wherein each of the MEO satellites is configured to: obtain its own resource task status in the time slot t, generate the resource scheduling information for the time slot t based on its own resource task status in the time slot t by using a trained resource scheduling information generation network, transmit the resource scheduling information for the time slot t to each of the more than one of the LEO satellites managed by the MEO satellite in the time slot t, determine, based on the resource scheduling information for the time slot t, whether to perform data computation on the computing task of each of the more than one of the LEO satellites managed by the MEO satellite in the time slot t, and a data volume that needs to be computed when performing the data computation, and perform computation on corresponding data volume of the computing task of each of the more than one of the LEO satellites managed by the MEO satellite in the time slot t based on the data volume that needs to be computed;

wherein the resource scheduling information for the time slot t represents: in the computing task of each of the more than one of the LEO satellites managed by the MEO satellite in the time slot t, a proportion of a data volume computed by the MEO satellite to a total data volume of the computing task of the LEO satellite; and values of the resource scheduling information range from 0 to 1.

2. The system for operation, maintenance and resource management of mega-constellation based on computing-networking integration as claimed in claim 1, wherein the resource task status of each of the MEO satellites in the time slot t comprises: energy state, link state, and on-board task data state of the MEO satellite in the time slot t; the energy state of the MEO satellite in the time slot t represents remaining power of the MEO satellite in the time slot t; the link state of the MEO satellite in the time slot t represents a sum of link capacities on the communication links between the MEO satellite and the more than one of the LEO satellites managed by the MEO satellite in the time slot t; and the on-board task data state of the MEO satellite in the time slot t represents a sum of data volumes of the computing tasks of the more than one of the LEO satellites managed by the MEO satellite in the time slot t.

3. The system for operation, maintenance and resource management of mega-constellation based on computing-networking integration as claimed in claim 1, wherein K is a number of the MEO satellites deployed to minimize an overall scheduling complexity of the system for operation, maintenance and resource management of mega-constellation when the LEO satellites are N in quantity; and the overall scheduling complexity of the system for operation, maintenance and resource management of mega-constellation is expressed as follows:

$$\Psi = \psi \cdot K$$

$$\psi = (N/K + 1) * N/K + (N/K)^2 + N/K + (N/K + 1)^3 * N/K + (L_{in} L_{hidden} + L_{hidden} * L_{hidden} +_{hidden} L_{out})$$

where, $\Psi$ represents the overall scheduling complexity of the system for operation, maintenance and resource management of mega-constellation, yr represents a scheduling complexity of each of the MEO satellites when managing the more than one of the LEO satellites, $L_{in}$ represents a dimension of input data of the trained resource scheduling information generation network, $L_{hidden}$ represents a number of neurons of a hidden layer of the trained resource scheduling information generation network, and $L_{out}$ represents a dimension of output data of the trained resource scheduling information generation network.

4. The system for operation, maintenance and resource management of mega-constellation based on computing-networking integration as claimed in claim 1, wherein the trained resource scheduling information generation network is trained by local reinforcement learning and federated learning methods with an optimization objective of minimizing energy consumption of the system for operation, maintenance and resource management of mega-constellation in one scheduling cycle; and energy constraint for each of the LEO satellites, energy constraint for each of the MEO satellites, computing constraint for each of the LEO satellites, computing constraint for each of the MEO satellites, and communication constraint for each of the LEO satellites are taken as constraints of the optimization objective.

5. The system for operation, maintenance and resource management of mega-constellation based on computing-networking integration as claimed in claim 4, wherein the energy constraint for each of the LEO satellites and the energy constraint for each of the MEO satellites are respectively expressed as follows:

$$EB_{l_n}^{max} \cdot (1-\Gamma_L) \le EB_{l_n,t} + EB_{l_n,t}^{h} - \left(E_{l_n,t}^{Ltr} + E_{l_n,t}^{comp}\right) \le EB_{l_n}^{max}$$

$$EB_{m_k}^{max}(1-\Gamma_M) \le EB_{m_k,t} + EB_{m_k,t}^{h} - \left(E_{m_k,t}^{Mre} + E_{m_k,t}^{comp}\right) \le EB_{m_k}^{max}$$

where, $l_n \in L$, $t \in \{1, \ldots T\}$, $m_k \in M$, L represents an LEO satellite set consisting of the LEO satellites N in quantity in the system for operation, maintenance and resource management of mega-constellation, $l_n$ represents an n-th LEO satellite of the LEO satellite set, a value of n is selected from the group consisting of 1, 2, . . . , N, t represents each time slot in one scheduling cycle T, M represents an MEO satellite set consisting of the MEO satellites K in quantity in the system for operation, maintenance and resource management of mega-constellation; $m_k$ represents an m-th MEO satellite of the MEO satellite set, a value of m is selected from the group consisting of 1, 2, . . . , K, $EB_{l_n}^{max}$ represents a maximum battery capacity of the n-th LEO satellite, $\Gamma_L$ represents a percentage of maximum discharge depth of the LEO satellite, $EB_{l_n,t}$ represents an existing power of the n-th LEO satellite in each time slot, $EB_{l_n,t}^{h}$ represents a charged power of the n-th LEO satellite in each time slot, $E_{l_n,t}^{Ltr}$ represents a transmitting energy consumption of the n-th LEO satellite in each time slot, $E_{l_n,t}^{comp}$ represents a computing energy consumption of the n-th LEO satellite in each time slot; $EB_{m_k}^{max}$ represents a maximum battery capacity of the m-th MEO satellite, $\Gamma_M$ represents a percentage of maximum discharge depth of the MEO satellite, $EB_{m_k,t}$ represents an existing power of the m-th MEO satellite in each time slot, $EB_{m_k,t}^{h}$ represents a charged power of the m-th MEO satellite in each time slot, $E_{m_k,t}^{Mre}$ represents a receiving energy consumption of the m-th MEO satellite in each time slot, and $E_{m_k,t}^{comp}$ represents a computing energy consumption of the m-th MEO satellite in each time slot.

6. The system for operation, maintenance and resource management of mega-constellation based on computing-networking integration as claimed in claim 1, wherein each of the MEO satellites comprises:
a resource task status monitoring module, configured to acquire resource usages and computing task execution statuses of the MEO satellite itself and each of the more than one of the LEO satellites managed by the MEO satellite within each time slot t of each scheduling cycle, to thereby obtain the resource task status of the MEO satellite in the time slot t;
a data computing and processing module, configured to: when needing to perform data computation on the computing task of each of the more than one of the LEO satellites managed by the MEO satellite in the time slot t, receive data of the computing task of each of the more than one of the LEO satellites managed by the MEO satellite, and perform the computation on the corresponding data volume of the computing task of each of the more than one of the LEO satellites managed by the MEO satellite in the time slot t based on the data volume that needs to be computed; and
a computing-networking integration scheduling optimization module, configured to train a resource scheduling information generation network by using the local reinforcement learning and federated learning methods to thereby obtain the trained resource scheduling information generation network, share and aggregate network parameters of the resource scheduling information generation network with remaining (K-1) number of MEO satellites during training the resource scheduling information generation network, generate the resource scheduling information for the time slot t based on the resource task status of the MEO satellite itself in the time slot t by using the trained resource scheduling information generation network, and transmit the resource scheduling information for the time slot t to each of the more than one of the LEO satellites managed by the MEO satellite in the time slot t.

7. A method for operation, maintenance and resource management of mega-constellation based on computing-networking integration, applied to each of the MEO satellites in the system for operation, maintenance and resource management of mega-constellation as claimed in claim 1, comprising:
obtaining resource task status of the MEO satellite itself in current time slot of current scheduling cycle;
generating resource scheduling information for the current time slot based on the resource task status of the MEO satellite itself in the current time slot by using the trained resource scheduling information generation network; wherein the trained resource scheduling information generation network is obtained by training through local reinforcement learning and federated learning methods, the resource scheduling information for the current time slot represents: in a computing task of each of the more than one of the LEO satellites managed by the MEO satellite in the current time slot, a proportion of a data volume computed by the MEO satellite to a total data volume of the computing task of the LEO satellite;
transmitting the resource scheduling information for the current time slot to each of the more than one of the LEO satellites managed by the MEO satellite in the current time slot;
determining, based on the resource scheduling information for the current time slot, whether to perform data computation on the computing task of each of the more than one of the LEO satellites managed by the MEO satellite in the current time slot, and a data volume that needs to be computed when performing the data computation; and
performing, when needing to perform data computation on the computing task of each of the more than one of the LEO satellites managed by the MEO satellite in the current time slot, computation on corresponding data volume of the computing task of each of the more than one of the LEO satellites managed by the MEO satellite in the current time slot based on the data volume that needs to be computed.

8. The method for operation, maintenance and resource management of mega-constellation based on computing-networking integration as claimed in claim 7, wherein a training method of the trained resource scheduling information generation network of each of the MEO satellites comprises:
acquiring, at a c-th time slot in a k-th round of training, a resource task status of the MEO satellite in the c-th time slot; wherein each round of training corresponds to one scheduling cycle, each scheduling cycle has T number of time slots, training is conducted once every preset update step length of time slots; when c=1, the resource task status of the MEO satellite in the c-th time slot is a preset status;
determining, based on a resource scheduling information generation network obtained in a (c-1)-th time slot and the resource task status in the c-th time slot, resource scheduling information for the c-th time slot; wherein, when c=1, the resource scheduling information generation network obtained in the (c-1)-th time slot is a resource scheduling information generation network obtained by a last one time of training in a (k-1)-th round of training;
determining, based on the resource scheduling information for the c-th time slot, a reward in the c-th time slot and a resource task status in a (c+1)-th time slot of the MEO satellite;
determining, based on c, the preset update step length and the resource scheduling information generation networks obtained in the (c-1)-th time slot, whether to update network parameters of current resource scheduling information generation network, and obtaining a resource scheduling information generation network in the c-th time slot;
determining, based on c, a preset aggerate step length and the resource scheduling information generation network obtained in the c-th time slot, whether to perform network parameter aggregation with the remaining (K-1) number of MEO satellites, and obtaining a latest resource scheduling information generation network in the c-th time slot; and
continuing determining, based on the resource task status of the MEO satellite in the (c+1)-th time slot and the latest resource scheduling information generation network in the c-th time slot, a latest resource scheduling information generation network in the (c+1)-th time slot in the k-th round of training, and completing the k-th round of training until a T-th time slot in the k-th round of training is reached; and continuing conducting a (k 1)-th round of training until an iteration termination condition is reached, to thereby obtain the trained resource scheduling information generation network of the MEO satellite.

9. The method for operation, maintenance and resource management of mega-constellation based on computing-networking integration as claimed in claim 8, wherein the determining, based on c, a preset aggerate step length and the resource scheduling information generation network obtained in the c-th time slot, whether to perform network parameter aggregation with the remaining (K-1) number of MEO satellites, and obtaining a latest resource scheduling information generation network in the c-th time slot comprise:
performing a remainder operation on c and the preset aggerate step length to obtain a first operation result;
obtaining resource scheduling information generation networks of the remaining (K-1) number of MEO satellites in the c-th time slot when the first operation result is 0, aggregating, using a preset aggregation update matrix, network parameters of the resource scheduling information generation network in the c-th time slot of the MEO satellite with network parameters of the resource scheduling information generation networks of the remaining (K-1) number of MEO satellites in the c-th time slot to obtain aggregated network parameters in the c-th time slot, updating, using the aggregated network parameters in the c-th time slot, the resource scheduling information generation network in the c-th time slot of the MEO satellite, and obtaining the latest resource scheduling information generation network in the c-th time slot;
taking the resource scheduling information generation network in the c-th time slot of the MEO satellite as the latest resource scheduling information generation network in the c-th time slot when the first operation result is not 0.

* * * * *